United States Patent
Yoo

(10) Patent No.: US 9,466,842 B2
(45) Date of Patent: Oct. 11, 2016

(54) FUEL CELL ELECTRODE CATALYST INCLUDING A CORE CONTAINING PLATINUM, A TRANSITION METAL, AND A NONMETAL ELEMENT AND A SHELL CONTAINING PLATINUM AND THE NONMETAL ELEMENT ELECTRODE INCLUDING THE SAME, AND METHOD FOR PREPARING THE SAME

(71) Applicant: Samsung Electronics Co., Ltd., Suwon-si, Gyeonggi-do (KR)

(72) Inventor: Dae-jong Yoo, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 259 days.

(21) Appl. No.: 14/153,183

(22) Filed: Jan. 13, 2014

(65) Prior Publication Data

US 2015/0086903 A1    Mar. 26, 2015

(30) Foreign Application Priority Data

Sep. 26, 2013  (KR) ........................ 10-2013-0114690

(51) Int. Cl.
  *H01M 4/86*  (2006.01)
  *H01M 4/88*  (2006.01)
  *H01M 4/90*  (2006.01)
  *H01M 4/92*  (2006.01)
  *H01M 8/10*  (2016.01)

(52) U.S. Cl.
  CPC ............. *H01M 4/8657* (2013.01); *H01M 4/88* (2013.01); *H01M 4/923* (2013.01); *H01M 4/926* (2013.01); *H01M 2004/8689* (2013.01); *H01M 2008/1095* (2013.01); *Y02E 60/50* (2013.01)

(58) Field of Classification Search
  CPC .. H01M 4/8657; H01M 4/923; H01M 4/926; H01M 4/88
  USPC ........ 429/487, 524, 535, 523, 527, 528, 532
  See application file for complete search history.

(56) References Cited

U.S. PATENT DOCUMENTS

| | | | |
|---|---|---|---|
| 2008/0008920 A1* | 1/2008 | Alexandrovich-serov | H01M 4/8626 429/483 |
| 2011/0077147 A1 | 3/2011 | Stamenkovic | |
| 2012/0316054 A1 | 12/2012 | Lopez | |
| 2013/0149632 A1* | 6/2013 | Yoo | H01M 4/8621 429/487 |

FOREIGN PATENT DOCUMENTS

| | | | |
|---|---|---|---|
| JP | 2011-009129 A | 1/2011 | |
| JP | 2011072981 A | 4/2011 | |
| KR | 1020080045155 A | 5/2008 | |
| KR | 2008071766 A * | 8/2008 | H01M 4/90 |
| KR | 10-0879299 B1 | 1/2009 | |

OTHER PUBLICATIONS

Min et al., Machine translation of KR 2008071766 A, Aug. 2008.*

* cited by examiner

*Primary Examiner* — Sean P Cullen
(74) *Attorney, Agent, or Firm* — Cantor Colburn LLP

(57) ABSTRACT

An electrode catalyst for a fuel cell, the electrode catalyst including an active particle, the active particle including a core including platinum, a transition metal, and a first nonmetal element; and a shell on the core, the shell including an alloy including platinum and a second nonmetal element, wherein the first and second nonmetal elements included in the core and the shell are the same or different.

22 Claims, 9 Drawing Sheets

FUEL CELL ELECTRODE CATALYST INCLUDING A CORE CONTAINING PLATINUM, A TRANSITION METAL, AND A NONMETAL ELEMENT AND A SHELL CONTAINING PLATINUM AND THE NONMETAL ELEMENT ELECTRODE INCLUDING THE SAME, AND METHOD FOR PREPARING THE SAME

RELATED APPLICATIONS

This application claims priority to and the benefit of Korean Patent Application No. 10-2013-0114690, filed on Sep. 26, 2013, in the Korean Intellectual Property Office, and all the benefits accruing therefrom under 35 U.S.C. §119, the content of which is incorporated herein in its entirety by reference.

BACKGROUND

1. Field

The present disclosure relates an electrode catalyst for fuel cell, an electrode for fuel cell including the electrode catalyst and a fuel cell including the same, and a method for preparing the electrode catalyst.

2. Description of the Related Art

Fuel cells may be classified according to the type of electrolyte and fuel as a polymer electrolyte membrane fuel cell (PEMFC), a direct methanol fuel cell (DMFC), a phosphoric acid fuel cell (PAFC), a molten carbonate fuel cell (MCFC), or a solid oxide fuel cell (SOFC).

PEMFC and DMFC usually include a membrane-electrode assembly (MEA) including an anode, a cathode, and a polymer electrolyte membrane between the anode and the cathode. An anode of a fuel cell employs a catalysis layer for catalyzing oxidation of a fuel, and a cathode employs a catalysis layer for catalyzing reduction of an oxidizing agent.

In general, as a component of the anode and the cathode, a platinum (Pt) catalyst, which is stable and has an excellent oxygen reduction reaction capacity, is used. However, because Pt is expensive and, as the demand for Pt for use as an electrode catalyst is still great for mass production of a commercially feasible fuel cell, system cost reduction is desired.

Therefore, there is still a need for an electrode catalyst for a fuel cell, wherein the electrode catalyst provides increased Pt activity and has excellent performance and stability, an electrode for a fuel cell including the electrode catalyst, and a fuel cell including the same, and a method for preparing the electrode catalyst for fuel cell.

SUMMARY

Disclosed is an electrode catalyst for a fuel cell, wherein an oxygen reduction reaction activity of the catalyst is improved and stability is excellent.

Another aspect provides an electrode for a fuel cell including the electrode catalyst.

Another aspect provides a fuel cell including the electrode catalyst.

Another aspect provides a method of preparing an electrode catalyst for a fuel cell, wherein an oxygen reduction reaction activity of the catalyst is improved and stability is excellent.

According to an aspect, disclosed is an electrode catalyst for a fuel cell, the electrode catalyst including an active particle, the active particle including: a core including an alloy including platinum, a transition metal, and a first nonmetal element; and a shell on the core, the shell including an alloy including platinum and a second nonmetal element, wherein the first and second nonmetal elements included in the core and the shell are the same or different.

According to another aspect, an electrode for a fuel cell includes the electrode catalyst.

According to another aspect, a fuel cell includes a cathode; an anode disposed opposite to the cathode; and an electrolyte membrane disposed between the cathode and the anode, wherein at least one of the cathode and the anode includes the electrode catalyst.

According to another aspect, a method of preparing an electrode catalyst for a fuel cell includes: heat-treating a metal precursor mixture including a platinum precursor, a transition metal precursor, and a nonmetal element precursor to obtain a precatalyst; and treating the precatalyst with an acid to obtain the electrode catalyst for a fuel cell, which includes an active particle, the active particle including a core including an alloy including platinum, a transition metal, and a first nonmetal element; and a shell on the core, the shell including an alloy including platinum and a second nonmetal element, wherein the first and second nonmetal elements included in the core and the shell are the same or different.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
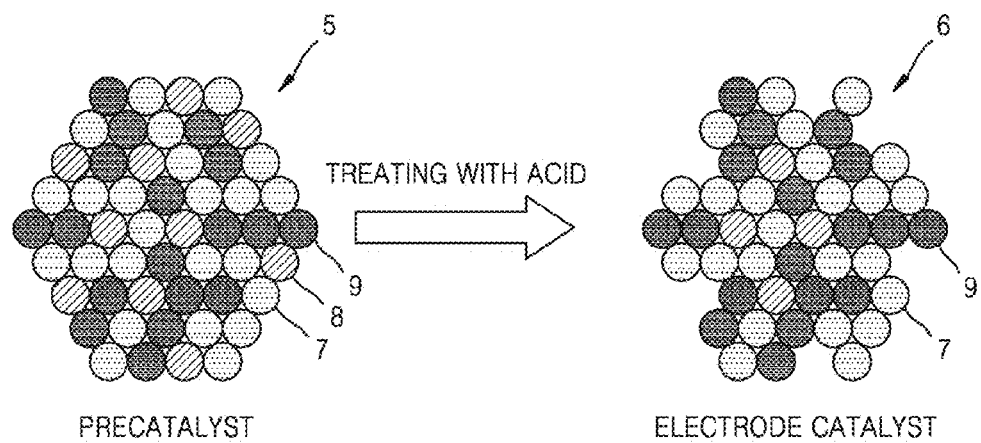
FIG. 1 shows a schematic diagram of an embodiment of a process of acid treatment to provide an electrode catalyst for a fuel cell.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrode catalyst for a fuel cell according to an embodiment, an electrode for a fuel cell including the electrode catalyst, and a fuel cell including the same, and a method for preparing the electrode catalyst, are disclosed in further detail. However, the present disclosure is not limited thereto.

An aspect provides an electrode catalyst for a fuel cell, the electrode catalyst including an active particle including a core comprising an alloy including platinum, a transition metal, and a first nonmetal element; and a shell on the core, the shell comprising an alloy including platinum and a second nonmetal element, wherein the first and second nonmetal elements included in the core and the shell are the same or different.

Oxygen reduction reaction activity of a Pt catalyst is related to a d-band center which is associated with a Fermi level. In other words, a change to the d-band center can increase the oxygen reduction reaction activity of the catalyst. For this purpose, a Pt catalyst has been used in an alloy in which a transition metal is often used. By an effect of electronic interaction between Pt and the transition metal, an electronic environment of the Pt catalyst may be changed. However, due to the properties of the transition metal, in a Pt catalyst which is an alloy with the transition metal, a transition metal atom on a surface of the catalyst may be dissolved during an electrochemical process and thus catalytic activity may be decreased.

The disclosed electrode catalyst for a fuel cell includes an active particle including a core, and a shell comprising a platinum alloy. While not wanting to be bound by theory, it is understood that the structure including the core and the shell may prevent dissolution of the transition metal caused by a reaction with an acidic solution.

In addition, in the disclosed electrode catalyst, the nonmetal element may be introduced into the core, which also includes platinum and a transition metal, to increase a stability of the transition metal by bonding between the transition metal and the nonmetal element. In addition, a core of an alloy including a lattice-contracted platinum and a transition metal may cause a strain effect through de-alloying to increase oxygen reduction reaction activity. It is understood that due to the bonding of the transition metal and the nonmetal element, the shell including platinum may more effectively prevent dissolution of the transition metal, which may be caused by a reaction with an acidic solution.

Therefore, the electrode catalyst for a fuel cell may not only effectively prevent dissolution of the transition metal, which is understood to be caused by a reaction with an acidic solution, but also improve oxygen reduction reaction activity by having excellent stability and a strong strain-effect.

The nonmetal element included in the core and the shell may be, for example, a Group 16 element. The nonmetal element included in the core and the shell may be the same or different. Thus the core may comprise a first nonmetal element and the shell may comprise a second nonmetal element, and the first and second nonmetal elements may be the same or different. An embodiment in which the first and second nonmetal elements are the same is specifically mentioned. As the nonmetal element, an element belonging to Group 16, such as oxygen, or an element having properties similar to those of oxygen, may provide excellent selectivity to oxygen reduction. Therefore, a catalyst including such a nonmetal element may be used for a reductive electrode to facilitate oxygen reduction reaction and inhibit a reduction reaction of a fuel so that performance of a fuel cell may be improved.

For example, the core may be represented by Chemical Formula 1 below.

$$PtM_aA_b \qquad \text{Chemical Formula 1}$$

In Chemical Formula 1,

M may be at least one selected from the group of cobalt (Co), iron (Fe), nickel (Ni), copper (Cu), rubidium (Ru), molybdenum (Mo), titanium (Ti), vanadium (V), and tungsten (W), A may be sulfur (S), selenium (Se), or tellurium (Te), a may be in a range of $0<a\leq0.6$, and b may be in a range of $0\leq b\leq0.5$.

In Chemical Formula 1, M may be at least one selected from the group of Co, Fe, Ni, and Cu, and A may be S.

In Chemical Formula 1, a and b represent a content (e.g., in moles) of M and A, respectively, with respect to one mole of Pt.

When the ranges of a and b in Chemical Formula 1 above are as described above, the oxygen reduction reaction activity of the electrode catalyst may be increased. While not wanting to be bound by theory, it is understood that a combination of Pt(Fe—S), Pt(Fe), and Pt—S may be present in a combined form in the core to not only modify a surface of the platinum but also improve stability of the transition metal and to cause lattice strain to increase oxygen reduction reaction activity.

For example, the shell may be represented by Chemical Formula 2 below.

$$Pt(A1)_c \qquad \text{Chemical Formula 2}$$

In Chemical Formula 2,

A1 may be at least one selected from the group of sulfur (S), selenium (Se), and tellurium (Te), and c may be in a range of $0\leq c\leq0.5$.

In Chemical Formula 2 above, A1 may be sulfur (S).

In Chemical Formula 2 above, c represents content (e.g., moles) of A1 with respect to one mole of Pt.

When the range of c in Chemical Formula 2 above is as described above, dissolution of the transition metal during a reaction with an acidic solution may be effectively prevented.

FIG. 1 shows a schematic diagram of an embodiment of a process for preparing the electrode catalyst for a fuel cell.

As shown in FIG. 1, an electrode catalyst composition of an alloy including platinum, a transition metal, and a nonmetal element is provided by treating a precatalyst 5 with an acid, such as nitric acid, so that ions of the transition metal, e.g., iron ions such as $Fe^{2+}$ and/or $Fe^{3+}$, are dissolved from the surface of the precatalyst to form an electrode catalyst 6 including a core which comprises an alloy including platinum 7, the transition metal 8, and the nonmetal element 9, and a shell which comprises an alloy including platinum and the nonmetal element. An embodiment in which the transition metal is iron and the nonmetal element is sulfur is specifically mentioned. When an electrode catalyst has such a structure, oxygen reduction reaction activity may be improved and stability may be increased.

The average particle size of the active particle may be from about 1 nanometer (nm) to about 10 nm, for example, from about 2 nm to about 8 nm. When the average particle size of the active particle is in the foregoing range, a suitable electrochemical specific surface area may be maintained to improve oxygen reduction reaction activity.

The weight ratio of the core to the shell may be from about 1:0.01 to about 1:1, for example about 1:0.1 to about 1:0.99, or 1:0.5 to about 1:0.95. The weight ratio may be determined by inductively coupled plasma and XPS analysis, which is further disclosed below.

The catalyst may additionally include a carbonaceous, e.g., carbon-based, support. An active particle may be supported on the carbonaceous support. The active particle may be supported on the carbonaceous support such that it is dispersed, e.g., without coagulation and/or contact of adjacent particles with each other.

The carbonaceous support may comprise, for example, at least one selected from the group of Ketjen black, carbon black, graphite, carbon nanotube, and carbon fiber, but is not limited thereto.

The content of the active particle may be from about 20 parts by weight to about 80 parts by weight, for example, from about 30 parts by weight to about 60 parts by weight, with respect to 100 parts by weight of the carbonaceous support. An electrode catalyst including the active particle in a content within the foregoing range may provide improved electrochemical specific surface area and provide improved oxygen reduction reaction activity.

Another aspect provides an electrode for a fuel cell including the electrode catalyst described above.

A fuel cell includes a cathode, an anode, and an electrolyte membrane disposed, e.g., positioned, between the cathode and the anode, wherein at least one of the cathode and the anode includes the electrode catalyst.

For example, the cathode includes an embodiment of the electrode catalyst.

The fuel cell employs the catalyst support and the catalyst to maintain the electrode catalyst activity at a desired level even when the fuel cell is operated for a long time or at a high temperature.

The fuel cell may be provided, as a specific example, as a polymer electrolyte membrane fuel cell (PEMFC) or a direct methanol fuel cell (DMFC).

Figure 2:
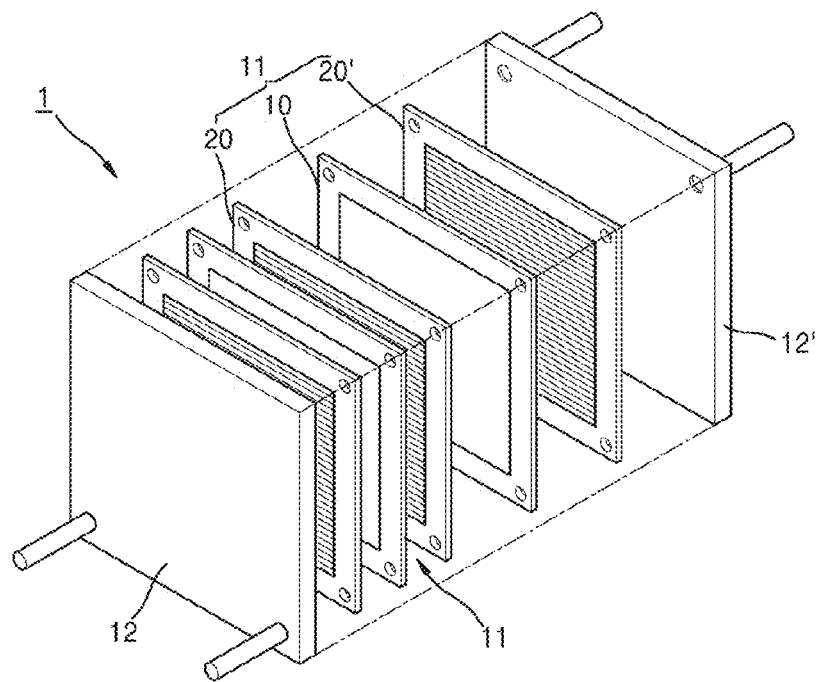
FIG. 2 shows an exploded perspective view of an embodiment of a fuel cell.
Figure 3:
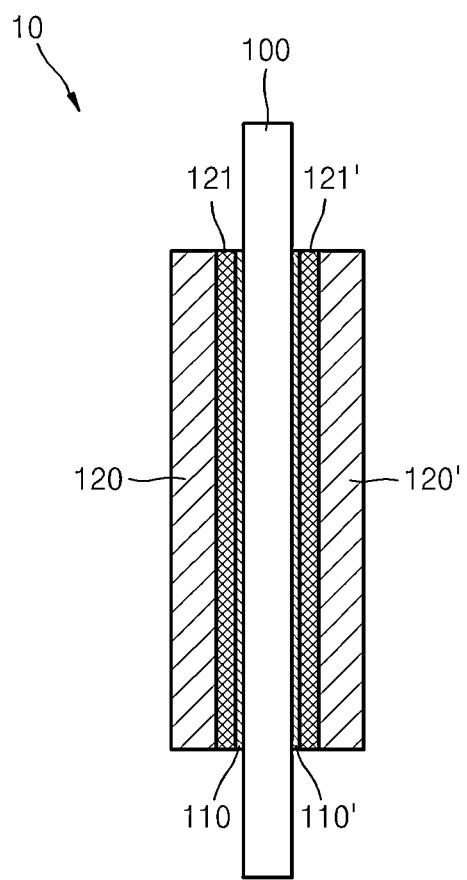
FIG. 3 shows a cross-sectional schematic diagram of an embodiment of a membrane-electrode assembly (MEA) of the fuel cell of FIG. 2.
Figure 4A:
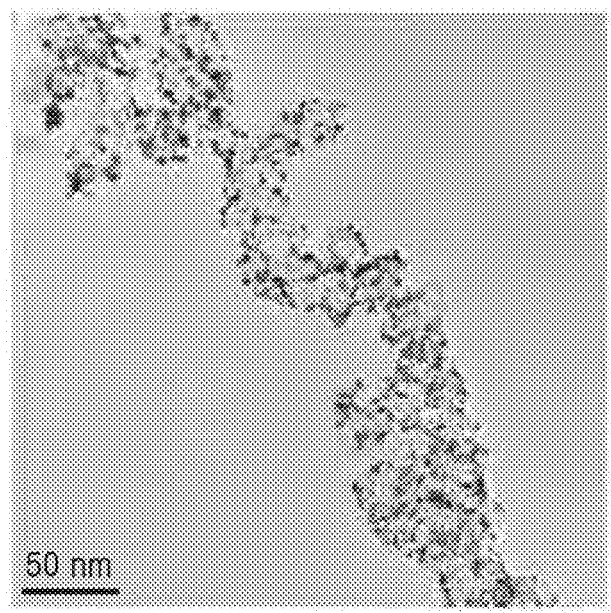
FIGS. 4A through 4C show the High-Resolution Transmission Electron Microscopy (HR-TEM) analysis results of the electrode catalysts prepared by Examples 1 and 2 and Comparative Example 1.
Figure 4B:
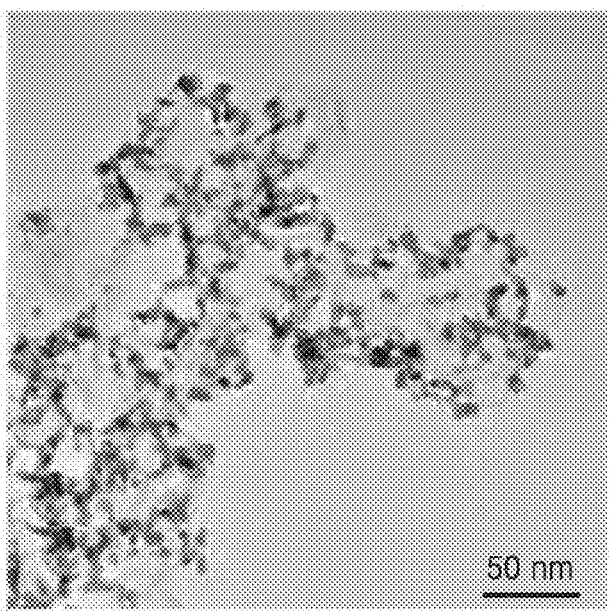
Figure 4C:
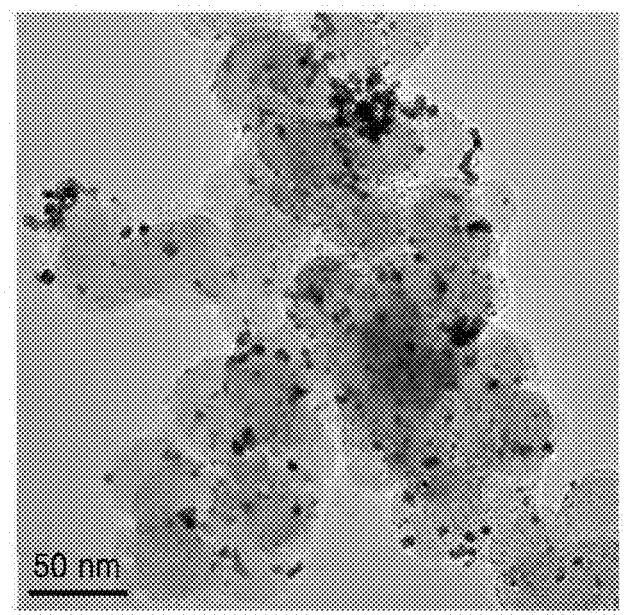
Figure 4D:
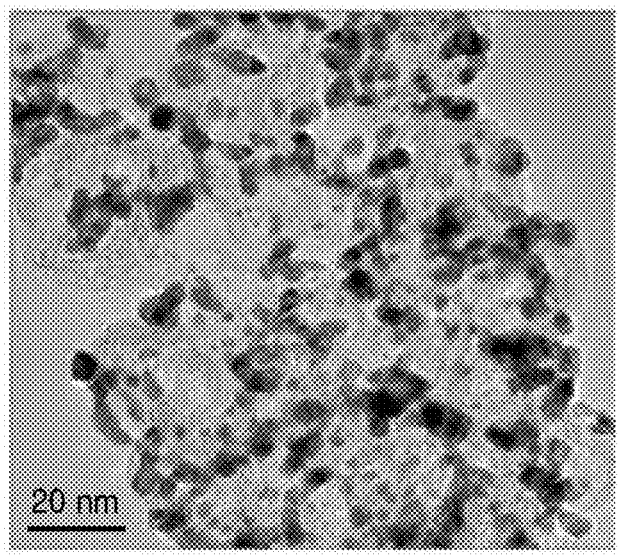
FIGS. 4D through 4F are expanded views of portions of FIGS. 4A through 4C, respectively.
Figure 4E:
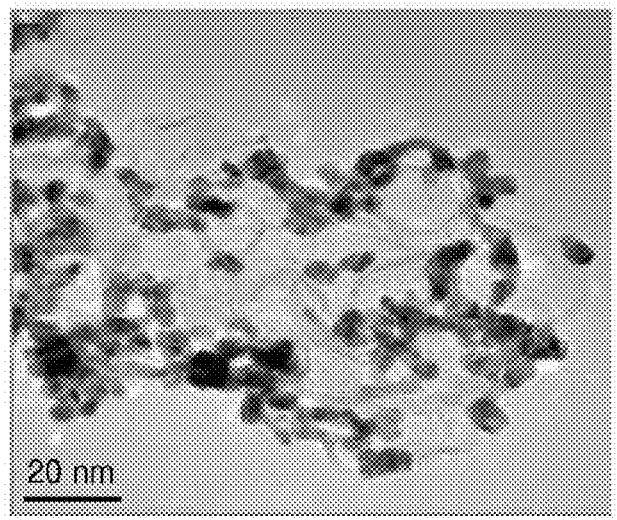
Figure 4F:
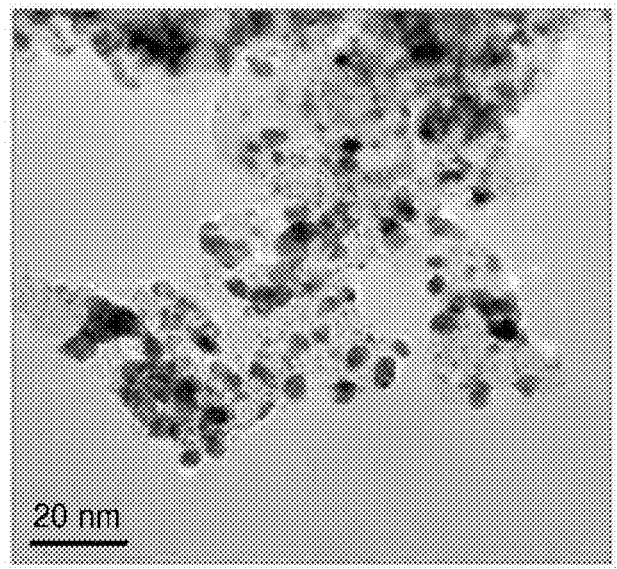
Figure 4G:
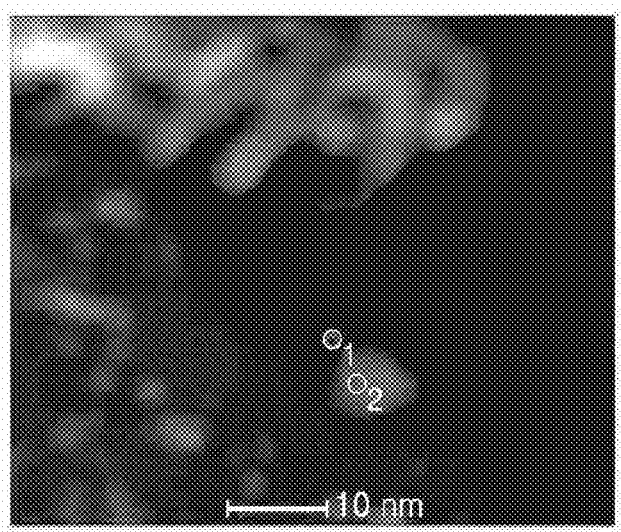
FIGS. 4G through 4I are backscatter images of portions of FIGS. 4A through 4C, respectively.
Figure 4H:
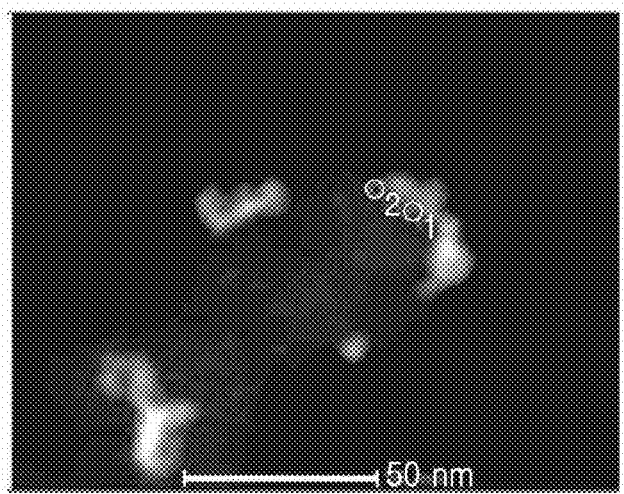
Figure 4I:
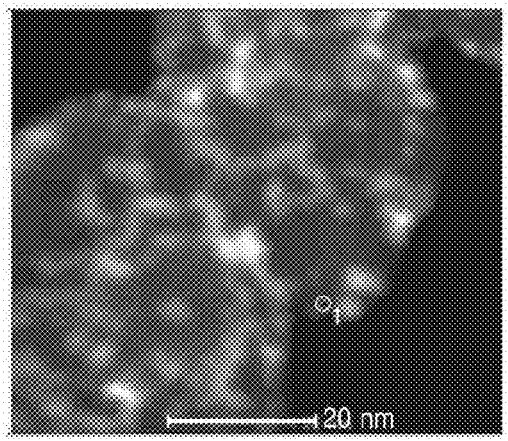

FIG. 2 shows an exploded perspective view of an embodiment of a fuel cell, and FIG. 3 is a cross sectional schematic diagram of an embodiment of an MEA of the fuel cell of FIG. 2.

The fuel cell 1 shown in FIG. 2 is comprises two unit cells 11, which are held by a pair of holders, i.e., first and second holders 12 and 12', respectively. Each unit cell includes a MEA 10 and first and second bipolar plates 20 and 20', respectively, which are arranged on opposite sides of the MEA 10 in the thickness direction. The first and second bipolar plates 20 and 20' may comprise a conductive metal or carbon and may be individually disposed on the MEA 10 to function as a current collector and, at the same time, supply oxygen and fuel to a catalyst layer of the MEA 10.

The fuel cell shown in FIG. 2 has two unit cells 11, but the number of unit cells is not limited to two, and can be tens or hundreds, or 1 to 1000, as desired.

The MEA 10 may include an electrolyte layer, catalyst layers which are disposed on opposite sides of the electrolyte layer in the thickness direction, wherein the electrode catalyst according to an embodiment is contained in at least one of them, first gas diffusion layers which are laminated to each of the catalyst layers, and second diffusion layers which are laminated to each of the first gas diffusion layers.

An embodiment of the MEA is shown in further detail in FIG. 3. The MEA 10 may include, as illustrated in FIG. 3, an electrolyte membrane 100, a first and a second catalyst layers 110 and 110' that are disposed on opposite sides of the electrolyte membrane 100 in the thickness direction of the electrolyte membrane 100, first and the second primary gas diffusion layers 121 and 121' deposited on the catalyst layers 110 and 110', respectively, and first and the second secondary gas diffusion layers 120 and 120' deposited on the primary gas diffusion layers 121 and 121', respectively, wherein at least one of the catalyst layers 110 and 110' includes the electrode catalyst.

The catalyst layers may function as a fuel electrode and an oxygen electrode and a catalyst and a binder are included respectively. The catalyst layers may additionally include a substance which may increase the electrochemical surface area of the catalyst. At least one of the catalyst layers includes the electrode catalyst.

The primary gas diffusion layers and the secondary diffusion layers may comprise, for example, a carbon sheet and a carbon paper, respectively. The primary gas diffusion layers and the secondary diffusion layers diffuse the oxygen and the fuel supplied by the bipolar plates to the entire surface of the catalyst layers.

The fuel cell including the MEA 10 may be operated at a temperature from about 100° C. to about 300° C. To a catalyst layer of the fuel cell, a fuel, for example, hydrogen, is supplied through the first bipolar plate 20, while, to another catalyst layer of the fuel cell, an oxidizing agent, for example, oxygen, is supplied through the second bipolar plate 20'. On a catalyst layer of the fuel cell, hydrogen is oxidized to produce a hydrogen ion (H+) which conductively passes through the electrolyte membrane to reach the other catalyst layer of the opposite side. On the other catalyst layer of the fuel cell, the hydrogen ion electrochemically reacts with oxygen to produce water ($H_2O$) and electric energy simultaneously. In addition, the hydrogen, which is supplied as a fuel, may be produced by reforming of a hydrocarbon or an alcohol and the oxygen which is supplied as an oxidizing agent may be supplied as it is included in the air.

Another aspect provides a method of preparing an electrode catalyst for a fuel cell including heat-treating, e.g., in a reactor, a metal precursor mixture including a platinum precursor, a transition metal precursor, and a nonmetal element precursor to obtain a precatalyst; and treating the precatalyst with an acid the precatalyst to obtain the electrode catalyst for fuel cell. The electrode catalyst comprises an active particle, the active particle comprising a core comprising an alloy comprising platinum, a transition metal, and a first nonmetal element; and a shell on the core, the shell comprising an alloy comprising platinum and a second nonmetal element, wherein the first and second nonmetal elements included in the core and the shell are the same or different.

A metal precursor mixture including a platinum precursor, a transition metal precursor, and a nonmetal element precursor may be prepared by dissolving each of the foregoing in a solvent. The metal precursor mixture may be heat-treated in a reactor to obtain the precatalyst.

The platinum precursor may be at least one compound of $H_2PtCl_6$, $H_2PtCl_4$, $K_2PtCl_6$, $K_2PtCl_4$, and $PtCl_2(NH_3)_4$, but not limited thereto. The platinum precursor may comprise platinum nitride, platinum chloride, platinum sulfide, platinum acetate, platinum acetylacetonate, platinum cyanate, platinum isopropyl oxide, platinum nitrate, and platinum butoxide, but is not limited thereto. Any suitable platinum precursor may be used.

The transition metal precursor may be at least one selected from the group of a cobalt (Co) precursor, an iron (Fe) precursor, a nickel (Ni) precursor, a copper (Cu) precursor, a rubidium (Ru) precursor, a molybdenum (Mo) precursor, a titanium (Ti) precursor, a vanadium (V) precursor, and a tungsten (W) precursor. For example, the transition metal precursor may be at least one selected from the group of a cobalt (Co) precursor, an iron (Fe) precursor, a nickel (Ni) precursor, and a copper (Cu) precursor. For example, the transition metal precursor may be at least one selected from the group of a nitride, a halide such as a bromide or a chloride, a sulfide, an acetate, an acetyl acetonate, a cyanide, a cyanate, a sulfate, a hydroxide, and hydrate thereof including at least one selected from the group of cobalt (Co), iron (Fe), nickel (Ni), and a copper (Cu). For example, $FeCl_3 \cdot 6H_2O$ is specifically mentioned.

The nonmetal element precursor may be at least one selected from the group of a S precursor, a Se precursor, and a Te precursor, for example, $(NH_2)_2SC$.

The solvent may be water or a glycol, such as ethylene glycol, 1,2-propylene glycol, 1,3-butanediol, 1,4-butanediol, neopentyl glycol, diethylene glycol, 3-methyl-1,5-pentanediol, 1,6-hexanediol, and trimethylolpropane, or an alcohol such as methanol, ethanol, isopropyl alcohol (IPA), and butanol, or a combination thereof, but not limited thereto. Any suitable solvent which may dissolve and/or suitably disperse the precursor may be used.

The content of the solvent may be from about 100 parts by weight to about 200 parts by weight, based on 100 parts by weight of the platinum precursor.

The metal precursor mixture may further include a carbonaceous, e.g., a carbon-based, support. When a carbonaceous support is added in the metal precursor mixture, the dispersibility of a precatalyst particle in the carbonaceous support may be improved.

According to an embodiment, the precatalyst may be prepared by the procedure disclosed below.

The metal precursor mixture is placed in an autoclave reactor. Then, after heat-treating the metal precursor mixture in the autoclave reactor, e.g., after a reduction reaction at a suitable temperature and/or under a suitable pressure, the resulting product of the reduction reaction may be filtered, washed, and dried to obtain the precatalyst.

The pH of the metal precursor mixture may be from about 10 to about 12, for example, about 11. In a pH range described above, a reduction reaction of the metal precursor mixture may be performed appropriately.

The metal precursor mixture may further include a chelating agent (e.g., ethylenediaminetetraacetic acid (EDTA), or a sodium citrate aqueous solution) and a pH regulator (e.g., a NaOH aqueous solution).

In addition, the reduction reaction may be performed by adding a reducing agent to the metal precursor mixture.

The reducing agent may be selected from substances capable of reducing the precursors included in the mixture for catalyst formation. For example, the reducing agent may be hydrazine ($NH_2NH_2$), sodium borohydride ($NaBH_4$), or formic acid, but is not limited thereto. The content of the reducing agent may be from about one to about three moles, based on one mole of the sum of the platinum precursor, the iron precursor, and the sulfur precursor. When the content of the reducing agent satisfies the range described above, a suitable reduction reaction may be induced.

A heat treatment temperature in the autoclave may be from about 200° C. to about 300° C., for example about 220° C. to about 280° C., or about 240° C. to about 260° C. When the reaction temperature is in the range described above, a uniform alloy particle may be formed by reducing the platinum precursor, the transition metal precursor, and the nonmetal precursor and, in the case where a carbonaceous support is added to the metal precursor mixture, the dispersibility of a precatalyst particle in a carbonaceous support may be improved.

The autoclave is a pressurized and heated reactor which is capable of increasing the temperature of a reactant mixture in the reactor above a boiling point of a solvent.

The pressure inside the autoclave may be from about 1.38 megapascals (MPa) to about 4.14 MPa, for example about 1.52 MPa to about 4 MPa, or about 1.65 MPa to about 3.86 MPai. For the reduction reaction, microwave energy may be used as a heat source. Any suitable heat source which increases the temperature of the autoclave reactor and can be installed outside the reactor may be used. The output power of the microwave may be from about 800 Watts (W) to about 1700 W. The reaction time may be, for example, from about 10 minutes to about one hour, specifically, from 10 minutes to about 30 minutes.

Use of microwave energy as a heat source for the reduction reaction provides advantages in that a preparation facility may be simplified and the reaction time may be shortened.

After completing the reduction reaction, the resulting product is filtered, washed, and dried to obtain a precatalyst.

The obtained precatalyst is treated with an acid to yield the electrode catalyst for a fuel cell. For the acid treatment, at least one selected from the group of nitric acid, sulfuric acid, hydrochloric acid, and acetic acid may be used, and the concentration may be from about 1 molar (M) to about 5 M, for example about 1.5 M to about 4 M. In addition, during the acid treatment of the precatalyst, for dissolution of the transition metal ions, e.g., $Fe^{2+}$ and/or $Fe^{3+}$ ions, an acid solution including the precatalyst may be heat-treated at a temperature of a boiling point of the solvent or higher, for example, at about 100° C. The resulting product is filtered, washed, and dried to yield an electrode catalyst for fuel cell including a core comprising an alloy including platinum, the transition metal, and the nonmetal element, and a shell comprising an alloy including platinum and the nonmetal element.

Hereinafter, an embodiment is disclosed in further detail with reference to Examples. However, it should be understood that the exemplary embodiments described herein should be considered in a descriptive sense only and not for purposes of limitation.

Unless otherwise defined, all technical terms used herein have the same meaning as commonly understood by one of ordinary skill in the art to which this invention belongs.

EXAMPLES

Example 1

Preparation of Electrode Catalyst 0.3 g of VULCAN® XC72R carbon (Cabot corporation, 250 square meters per gram, $m^2/g$), which is a carbon support, is mixed with ethylene glycol to obtain 135 grams (g) of a resulting mixture and dispersed by ultrasonication for 30 minutes to prepare a carbon support mixture.

To the carbon support mixture, a metal precursor mixture, which is dissolved in ethylene glycol, including 5.993 g of 8 weight percent (wt %) of the platinum precursor $H_2PtCl_6$ (the Pt content in $H_2PtCl_6$ is 39.8 wt %), 1.874 g of 8 wt % of the iron precursor $FeCl_3.6H_2O$, (the Fe content in $FeCl_3.6H_2O$ is 20.6 wt % and the atomic ratio of Pt to Fe is 1:0.56), and 0.352 g of the sulfur precursor, $(NH_2)_2SC$ (the atomic ratio of Fe to S is 4:3), was added and the resulting mixture was stirred for about 30 minutes to prepare an electrode catalyst composition. To the electrode catalyst composition, to control the size of the catalyst particle with respect to carbon, 25.18 milliliters (mL) of 1 M NaOH solution was added to control the pH at 11 or higher. Then, to increase the reducing power of the mixture, 2.095 g of a 50 wt % $NaH_2PO_2$ mixture and 1.57 g of 20 wt % hydrazine are further added to the mixture and mixed.

The resulting electrode catalyst composition is put into a Teflon-sealed autoclave reactor and microwaves (power: 1600 W) were radiated for about 60 minutes to increase the temperature of the autoclave reactor to about 250° C. in order to perform a reduction reaction. The pressure inside the reactor was about 1.38 MPa.

After the reaction is completed, the resulting product was filtered, washed, and dried to obtain a precatalyst of the formula $PtFe_{0.162}S_{0.124}/C$, wherein "/C" represents the carbon support. The content of $PtFe_{0.162}S_{0.124}/C$, which is the active particle in the precatalyst, was about 45 parts by weight, based on 100 weight parts of the total precatalyst weight, i.e., total weight of the active particle and the carbon support.

The precatalyst, $PtFe_{0.162}S_{0.124}/C$, was treated with an acid using 200 g of 1 M $HNO_3$ at 90° C. for 60 minutes for dissolution of $Fe^{2+}$ and/or $Fe^{3+}$ ions. The resulting product was filtered, washed, and dried to prepare an electrode catalyst of the formula $PtFe_{0.282}S_{0.078}@PtS_{0.5}/C$, including a core of $PtFe_{0.282}S_{0.078}$ and a shell of $PtS_{0.5}$, which are on the carbon support. In the formulas, the symbol "@" is used to distinguish the core and the shell.

Example 2

Preparation of Electrode Catalyst

Except that the content of the sulfur precursor, $(NH_2)_2SC$, was 3.306 g when preparing the metal precursor mixture, a method the same as that of Example 1 was used to prepare an electrode catalyst, $PtFe_{0.296}S_{0.166}@PtS_{0.5}/C$.

Comparative Example 1

Preparation of Electrode Catalyst

Except that the sulfur precursor, $(NH_2)_2SC$, was not added when preparing the metal precursor mixture, a method the same as that of Example 1 was used to prepare an electrode catalyst, $PtFe_{0.072}@Pt/C$.

Comparative Example 2

Preparation of Electrode Catalyst

Except that the precatalyst was not treated with an acid, a method the same as that of Example 1 was used to prepare an electrode catalyst, $PtFe_{0.162}$—$S_{0.124}/C$.

Comparative Example 3

Preparation of Electrode Catalyst

Except that iron precursor, $FeCl_3 \cdot 6H_2O$, was not added when preparing the metal precursor mixture, a method the same as that of Example 1 was used to prepare an electrode catalyst, $PtS_{0.14}/C$.

Evaluation Example 1

High Resolution Transmission Electron Microscopy Analysis

The electrode catalysts prepared by Examples 1 and 2 and Comparative Example 1 were analyzed by HR-TEM and the results are shown in FIGS. 4A through 4I.

As shown in FIGS. 4A through 4I, the electrode catalysts prepared by Examples 1 and 2 were uniformly dispersed in the carbon support. In addition, the electrode catalysts prepared by Examples 1 and 2 showed a different contrast, i.e., light and shade structure in the inner region and in the outer region, indicating that the electrode catalysts has a core-shell structure. On the contrary, the electrode catalyst prepared by Comparative Example 1 showed the same contrast structure in the inner region and in the outer region, indicating that the electrode catalyst does not have a core-shell structure.

Evaluation Example 2

X-Ray Diffraction Analysis

Figure 5:
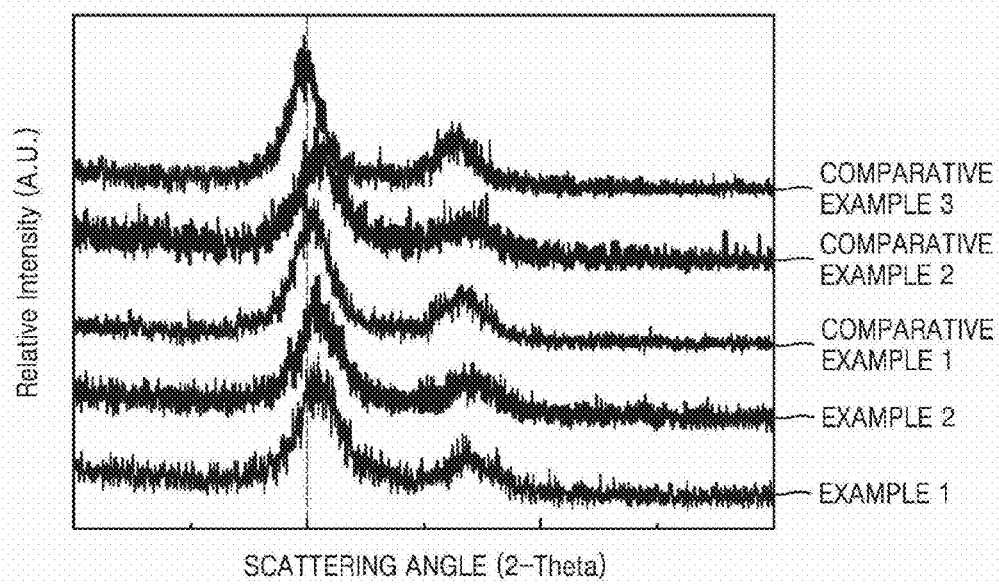
FIG. 5 is a graph of relative intensity (arbitrary units, a.u.) versus diffraction angle (degrees two-theta ($2\theta$)) which shows X-ray diffraction (XRD) analysis results of the electrode catalysts prepared by Examples 1 and 2 and Comparative Examples 1 through 3.

An X-ray diffraction (XRD) analysis (MP-XRD, Xpert PRO, Philips/Power 3 kW) was performed with the electrode catalysts prepared by Examples 1 and 2 and Comparative Examples 1 through 3, and the results are shown in FIG. 5 and Table 1 below.

TABLE 1

| Item | Diffraction Angle (2-theta) of (111) peak in XRD | Crystal Diameter of Active Particle (nm) |
|---|---|---|
| Example 1 | 40.5156 | 3.5 |
| Example 2 | 40.5699 | 3.731 |
| Comparative Example 1 | 40.2634 | 4.316 |
| Comparative Example 2 | 40.6069 | 3.335 |
| Comparative Example 3 | 39.9233 | 5.124 |

As shown in Table 1 above and FIG. 5, the position of the (111) peak of the electrode catalysts prepared by Examples 1 and 2, which was represented by the diffraction angle (2-theta), was shifted to the right with reference to the position of the (111) peak of the electrode catalyst prepared by Comparative Examples 1. While not wanting to be bound by theory, it is understood that this shift indicates that an iron particle was bound to the sulfur particle included with the platinum so that a high content of iron and sulfur are formed as an alloy in a platinum lattice.

Also, Table 1 shows that the crystal diameter of the electrode catalysts prepared by Examples 1 and 2 was smaller than that of the crystal diameter of the electrode catalyst prepared by Comparative Examples 1. While not wanting to be bound by theory, it is understood that this was because when an active particle was formed, iron and sulfur particles were formed inside a platinum particle so that growth of the active particle may be prevented.

Evaluation Example 3

X-Ray Photoelectron Spectroscopy Analysis

Figure 6A:
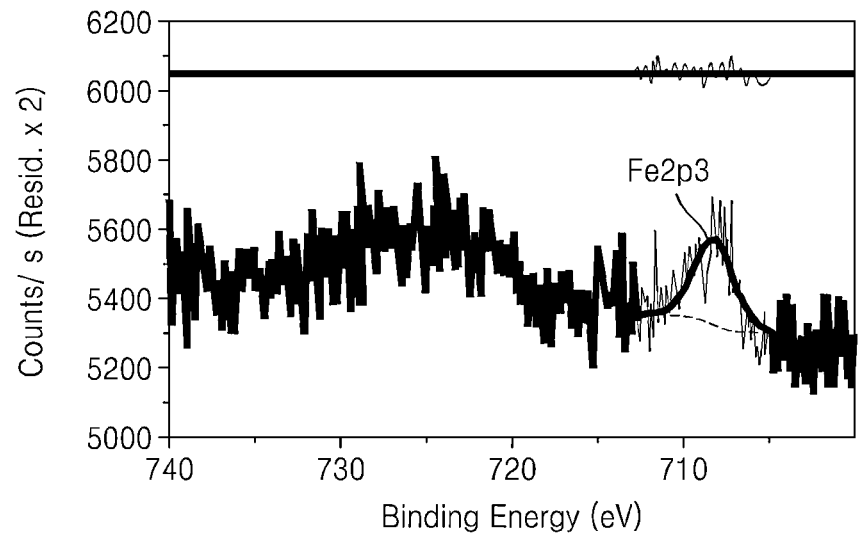
FIGS. 6a and 6b are each graphs of counts versus binding energy (electron volts, eV) which show X-ray photoelectron spectroscopy (XPS) analysis results of the electrode catalyst prepared by Example 1.
Figure 6B:
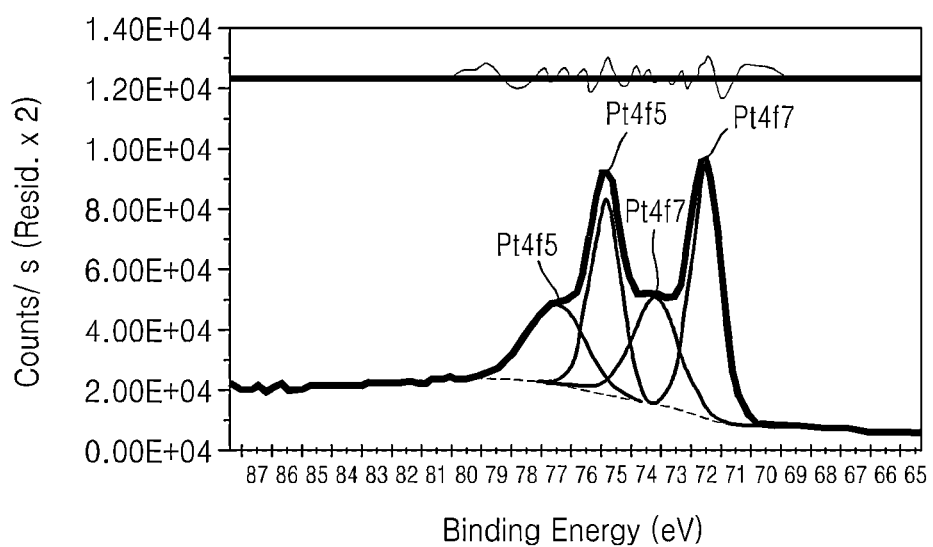

An X-ray photoelectron spectroscopy (XPS) analysis (Micro XPS, Quantom2000, Physical Electronics/Power: 27.7 W/beam size: 100 μm/hV=1486.6 eV) was performed with the electrode catalyst prepared by Example 1 and the results are shown in FIGS. 6a and 6b. In addition, the bond energy of iron and platinum and the atom concentration (wt %) obtained by the XPS analysis are shown in Tables 2 and 3 below.

TABLE 2

| Item | $Fe2P_{3/2}(Fe^{2+})$ (eV) | $Pt4f_{7/2}$ (Metal) (eV) | $Pt4f_{7/2}$ ($Pt^{4+}$) (eV) |
|---|---|---|---|
| Example 1 | 708.21 | 72.01 | 74.69 |
| Reference Example | 708.7 | 72.2 | 74.3 |

TABLE 3

| Item | $Fe2P_{3/2}(Fe^{2+})$ (wt %) | $Pt4f_{7/2}$ (Metal) (wt %) | $Pt4f_{7/2}$ ($Pt^{4+}$) (wt %) |
|---|---|---|---|
| Example 1 | 2.54 | 32.563 | 1.735 |

As shown in Tables 2 and 3 above and FIGS. 6a and 6b, the bond energy of the electrode catalyst prepared by Example 1, $Fe2P_{3/2}$, was 708.21 eV which is close to that of the Reference Example, 708.7 eV, indicating that iron is present in the state of a $Fe^{2+}$ ion and forms a Fe—S bond with part of the sulfur. In addition, the bond energy of $Pt4f_{7/2}$ (Metal) and $Pt4f_{7/2}$ ($Pt^{4+}$) of the electrode catalyst prepared by Example 1 was 72.01 eV and 74.69 eV, respectively, which are close to those of $Pt4f_{7/2}$ (Metal) and $Pt4f_{7/2}$ ($Pt^{4+}$) of the Reference Example, indicating that platinum is present in the state of a metal or a $Pt^{2+}$ or a $Pt^{4+}$ ion. These results show that the electrode catalyst prepared by Example 1 has Pt(Fe), Pt(FeS), and Pt—S bonds.

In addition, with respect to the atom concentration of each of the substances included in the electrode catalyst prepared by Example 1, the concentration analysis showed that the atom concentration of platinum in the form of Pt ions bound to S was about 5.06 wt % of the total weight and that a considerable portion is present as Pt metal. It was also shown that, in such a Pt metal lattice, Fe and Fe—S are present.

Evaluation Example 4

Inductively Couple Plasma Analysis

Inductively coupled plasma (ICP) analysis (ICP-AES, ICPS-8100, SHIMADZU/RF source 27.12 MHz/sample uptake rate 0.8 mL/min) was performed with the electrode catalysts prepared by Examples 1 and 2 and Comparative Examples 1 through 3 and the results are shown in Table 4 below.

TABLE 4

| Item | ICP Analysis Value (wt %) | | |
|---|---|---|---|
| | Pt | Fe | S |
| Example 1 | 34.32 | 2.63 | 0.56 |
| Example 2 | 33.88 | 2.72 | 1.02 |
| Comparative Example 1 | 38.91 | 1.73 | 0 |
| Comparative Example 2 | 34.98 | 5.68 | 4.34 |
| Comparative Example 3 | 40 | 0 | 1.023 |

In the case of the electrode catalysts prepared by Examples 1 and 2, the content of Pt bound to S on a surface of the electrode catalysts was 5.06 wt %, as shown by the XPS analysis. The result may be compared with the ICP analysis result to calculate the atomic ratio of the substances existing in the inner region and the outer region. The content of S is calculated through the Pt content existing on a surface of the electrode catalysts prepared by Examples 1 and 2 (Pt—S) and the XPS calculation value is subtracted from the total content through the ICP result to obtain the ratio of the atoms existing in the inner core. Table 5 shows the atomic ratios of the core substances and the shell substances of the electrode catalysts prepared by Examples 1 and 2.

TABLE 5

| | Atomic Ratio of Core Substances (wt %) | | | Atomic Ratio of Shell Substances (wt %) | |
|---|---|---|---|---|---|
| | Pt | Fe | S | Pt | S |
| Example 1 | 32.583 | 2.630 | 0.418 | 1.737 | 0.142 |
| Example 2 | 32.166 | 2.720 | 0.878 | 1.714 | 0.141 |

Based on Table 5 above, the total wt % of the core of an alloy including platinum, iron, and sulfur and the total wt % of the shell of an alloy including platinum and sulfur of the electrode catalysts prepared by Examples 1 and 2 may be calculated. The result shows that the weight ratio of the core to the shell is from about 35.6 to about 35.7 (core) to from about 1.8 to about 1.9 (shell).

In addition, each weight of the Pt, Fe, and S in the core of the electrode catalysts prepared by Examples 1 and 2 and each weight of Pt and S in the shell may be divided by each atomic weight of Pt, Fe, and S to calculate the atomic ratio. Recalculating of the atomic ratio with reference to one mole Pt shows that the composition of the core and the shell of the electrode catalysts prepared by Examples 1 and 2 is $PtFe_{0.282}S_{0.078}@PtS_{0.5}$ and $PtFe_{0.296}S_{0.166}@PtS_{0.5}$, respectively.

Evaluation Example 5

Oxygen Reduction Reaction (ORR) Evaluation

A mixture of 0.02 g of the electrode catalyst prepared in Example 1 and 10 g of ethylene glycol was dropped into a carbon rotated electrode (glassy carbon) in an amount of 15 μL with a micropipette. After vacuum drying the electrode at 80° C., a Nafion solution dispersed in 5 wt % ethylene glycol was dropped into the electrode in which catalyst was loaded and dried by the same method to prepare the electrode.

The electrode (working electrode) was installed on a rotating disk electrode (RDE), a platinum wire was prepared as a counter electrode, and Ag/AgCl ($KCl_{sat}$) was prepared as a reference electrode. The prepared three-phase electrode was put into 0.1 M $HClO_4$ electrolyte which then underwent bubbling with nitrogen for 30 minutes to remove remaining oxygen. A potentiostat/galvanostat was used to make an oxygen saturated solution in the electrolyte solution in a range from about 0.03 V to about 1.2 Volts (V) (vs. a normal hydrogen electrode, NHE). Then, while rotating the carbon electrode, the oxygen reduction reaction (ORR) current was recorded in an open circuit voltage (OCV) mode in the negative direction to the potential at which a material limiting current takes place (from about 0.3 V to about 1.0 V vs. NHE).

Instead of the electrode catalyst prepared by Example 1, the electrode catalysts prepared by Example 2 and Comparative Example 1 were used to record the ORR current by the same method described above and the results are shown in FIG. 7. The current density at about 0.9 V of potential is shown in Table 6 below and FIG. 7.

TABLE 6

| Item | Current Density (mA/cm$^2$) |
|---|---|
| Example 1 | −1.239 |
| Example 2 | −1.372 |
| Comparative Example 1 | −0.553 |
| Comparative Example 2 | 0.0554 |
| Comparative Example 3 | −0.0485 |

Figure 7:
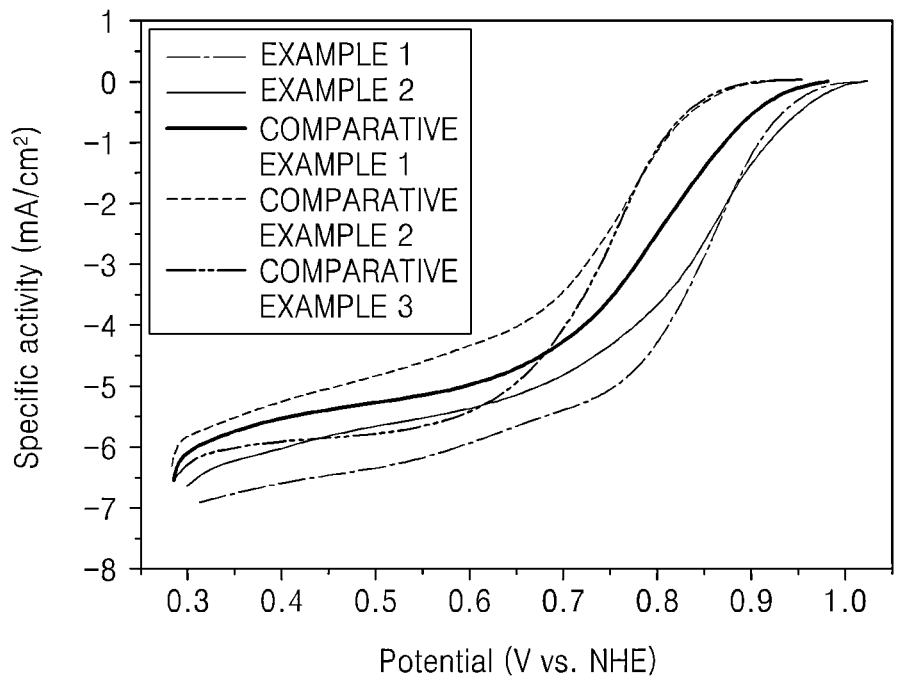
FIG. 7 is a graph of specific activity (milliamperes per square centimeter, mA/cm$^2$) versus potential (Volts (V) versus normal hydrogen electrode (NHE)) which shows the oxygen reduction reaction (ORR) properties of the electrodes employing the electrode catalysts prepared by Examples 1 and 2 and Comparative Examples 1 through 3.

As shown Table 6 above and FIG. 7, the electrode catalysts prepared by Example 1 and 2 showed better ORR reactivity than that of the electrode catalysts prepared by Comparative Examples 1 through 3.

Figure 8:
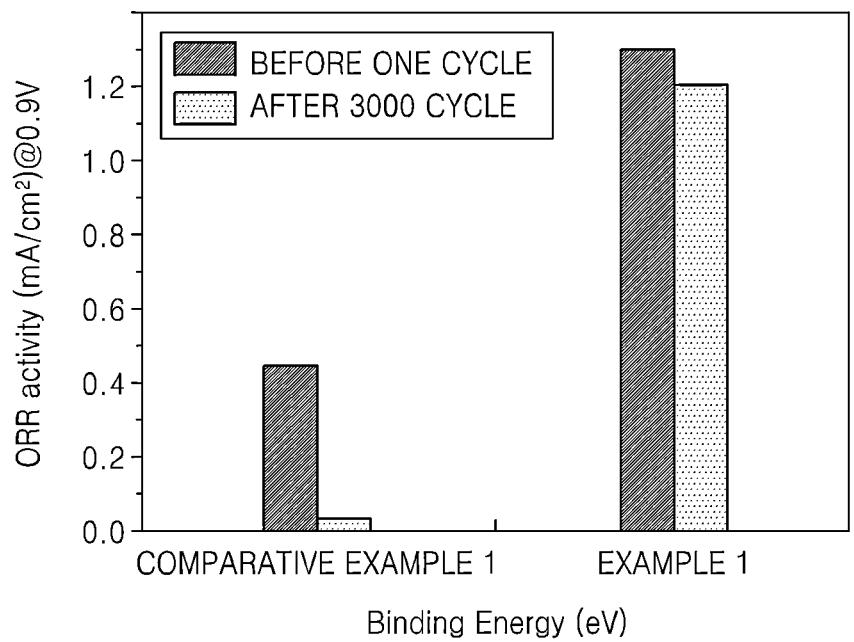
FIG. 8 is a histogram of oxygen reduction reaction (ORR) activity (milliamperes per square centimeter, mA/cm$^2$) at 0.9 volts (V) which shows the oxygen reduction reaction (ORR) properties of the electrodes employing the electrode catalysts prepared by Example 1 and Comparative Example 1 before one cycle and after 3000 cycles.

In addition, with electrodes employing the electrode catalysts prepared by Example 1 and Comparative Example 1, a potentiostat/galvanostat was used to record each ORR current density in a range from about 0 V to about 1.0 V (vs. NHE) at about 0.9 V of potential before one cycle and after 3000 cycles and the recorded results are shown in FIG. 8. A decay ratio (%) was calculated by using Mathematical Formula 1 below and shown in Table 7 below.

Decay Ratio (%)=[(current density after 3000 cycles)/(current density before one cycle)×100]    Mathematical Formula 1

TABLE 7

| Item | Current Density Before One Cycle (mA/cm$^2$) | Current Density After 3000 Cycles (mA/cm$^2$) | Decay ratio (%) |
|---|---|---|---|
| Example 1 | −1.239 | −1.148 | 7.31 |
| Comparative Example 1 | −0.553 | −0.0513 | 90.72 |

As shown in Table 7 above and FIG. 8, the decay ratio of the electrode catalyst prepared by Example 1 was significantly lower than that of the electrode catalyst prepared by Comparative Example 1. The result verified that, even after 3000 cycles, the electrode catalyst prepared by Example 1 has better ORR reactivity than that of the electrode catalyst prepared by Comparative Example 1.

As described above, an electrode catalyst for fuel cell according to an aspect and a fuel cell including the electrode catalyst include a nonmetal element in a core and in a shell of an active particle to improve the oxygen reduction reaction activity of the catalyst and have excellent stability.

It should be understood that the exemplary embodiments described herein should be considered in a descriptive sense only and not for purposes of limitation. Descriptions of features, advantages, or aspects within each embodiment should be considered as available for other similar features, advantages, or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. An electrode catalyst for a fuel cell, the electrode catalyst comprising an active particle, the active particle comprising:
   a core comprising a first alloy comprising platinum, a transition metal, and a first nonmetal element comprising at least one selected from the group consisting of oxygen (O), sulfur (S), selenium (Se), and tellurium (Te); and
   a shell on the core,
   the shell comprising a second alloy consisting of platinum and a second nonmetal element comprising at least one selected from the group consisting of oxygen (O), sulfur (S), selenium (Se), and tellurium (Te),
   wherein the first and second nonmetal elements included in the core and the shell are the same or different.

2. The electrode catalyst for a fuel cell of claim 1, wherein the first and second nonmetal elements included in the core and the shell are the same.

3. The electrode catalyst for a fuel cell of claim 1, wherein the core comprises a combination of Pt(Fe—S), Pt(Fe), and Pt—S.

4. The electrode catalyst for a fuel cell of claim 1, wherein an average particle size of the active particle is from about 1 nanometer to about 10 nanometers.

5. The electrode catalyst for a fuel cell of claim 1, wherein a weight ratio of the core to the shell is from about 1:0.01 to about 1:1.

6. The electrode catalyst for a fuel cell of claim 1, wherein the core is represented by Chemical Formula 1:

    Chemical Formula 1 wherein in Chemical Formula 1,
   M is at least one selected from the group of cobalt (Co), iron (Fe), nickel (Ni), copper (Cu), rubidium (Ru), molybdenum (Mo), titanium (Ti), vanadium (V), and tungsten (W),
   A is at least one selected from the group of sulfur (S), selenium (Se), and tellurium (Te),
   a is in a range of 0<a≤0.6, and b is in a range of 0<b≤0.5.

7. The electrode catalyst for a fuel cell of claim 6, wherein the M is at least one selected from the group of cobalt (Co), iron (Fe), nickel (Ni), and copper (Cu), and wherein A is sulfur (S).

8. The electrode catalyst for fuel cell of claim 1, wherein the shell is represented by Chemical Formula 2:

    Chemical Formula 2 wherein in Chemical Formula 2,
   A1 is at least one selected from the group of S, Se, and Te, and
   wherein c is in a range of 0<c≤0.5.

9. The electrode catalyst for a fuel cell of claim 8, wherein A1 in Chemical Formula 2 is sulfur (S).

10. The electrode catalyst for a fuel cell of claim 1, further comprising a carbonaceous support.

11. The electrode catalyst for a fuel cell of claim 10, wherein a content of the active particle is from about 20 parts by weight to about 80 parts by weight, based on 100 parts by weight of the carbonaceous support.

12. An electrode for a fuel cell, the electrode comprising the electrode catalyst of claim 1.

13. The electrode for a fuel cell of claim 12, wherein the electrode is a cathode.

14. A fuel cell comprising:
   a cathode;
   an anode disposed opposite to the cathode; and
   an electrolyte membrane disposed between the cathode and the anode,
   wherein at least one of the cathode and the anode comprises the electrode catalyst of claim 1.

15. A method of preparing an electrode catalyst for a fuel cell, the method comprising:
   heat-treating a metal precursor mixture comprising a platinum precursor, a transition metal precursor, and a nonmetal element precursor to obtain a precatalyst,
   wherein the nonmetal element precursor is selected from the group of an oxygen (O) precursor, a sulfur (S) precursor, a selenium (Se) precursor, a tellurium precursor, and combinations thereof; and
   treating the precatalyst with an acid to obtain the electrode catalyst for a fuel cell, which comprises an active particle, the active particle comprising
   a core comprising a first alloy comprising platinum, a transition metal, and a first nonmetal element comprising at least one selected from the group consisting of oxygen (O), sulfur (S), selenium (Se), and tellurium (Te); and
   a shell on the core,
   the shell comprising a second alloy consisting of platinum and a second nonmetal element comprising at least one selected from the group consisting of oxygen (O), sulfur (S), selenium (Se), and tellurium (Te),
   wherein the first and second nonmetal elements included in the core and the shell are the same or different.

16. The method of preparing an electrode catalyst for a fuel cell of claim 15, wherein the transition metal precursor is at least one selected from the group of a cobalt (Co) precursor, an iron (Fe) precursor, a nickel (Ni) precursor, a copper (Cu) precursor, a ruthenium (Ru) precursor, a molybdenum (Mo) precursor, a titanium (Ti) precursor, a vanadium (V) precursor, and a tungsten (W) precursor.

17. The method of preparing an electrode catalyst for a fuel cell of claim 15,
   wherein the nonmetal element precursor is at least one selected from the group of a sulfur (S) precursor, a selenium (Se) precursor, and a tellurium (Te) precursor.

18. The method of preparing an electrode catalyst for a fuel cell of claim 15, wherein the metal precursor mixture further comprises a carbonaceous support.

19. The method of preparing an electrode catalyst for a fuel cell of claim 15, wherein a pH of the metal precursor mixture is from about 10 to about 12.

20. The method of preparing an electrode catalyst for a fuel cell of claim 16, wherein a heat-treatment temperature is from about 200° C. to about 300° C., and a pressure in a reactor comprising the metal precursor mixture is from about 1.38 megapascals to about 4.14 megapascals.

21. The method of preparing an electrode catalyst for a fuel cell of claim 15, wherein the treating with an acid comprises treating with at least one selected from the group of nitric acid, sulfuric acid, hydrochloric acid, and acetic acid.

22. The method of preparing an electrode catalyst for a fuel cell of claim 15, wherein a concentration of the acid used for the treating is from about 1 molar to about 5 molar.

* * * * *